United States Patent

Moriyama

(10) Patent No.: US 9,189,683 B2
(45) Date of Patent: Nov. 17, 2015

(54) TARGET IMAGE DETECTION DEVICE, CONTROLLING METHOD OF THE SAME, CONTROL PROGRAM AND RECORDING MEDIUM RECORDED WITH PROGRAM, AND ELECTRONIC APPARATUS EQUIPPED WITH TARGET IMAGE DETECTION DEVICE

(75) Inventor: Kozo Moriyama, Kyotabane (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 279 days.

(21) Appl. No.: 12/391,076

(22) Filed: Feb. 23, 2009

(65) Prior Publication Data

US 2009/0231458 A1 Sep. 17, 2009

(30) Foreign Application Priority Data

Mar. 14, 2008 (JP) ................................. 2008-066775

(51) Int. Cl.
*H04N 5/225* (2006.01)
*G06K 9/00* (2006.01)
*G06K 9/68* (2006.01)

(52) U.S. Cl.
CPC ........ *G06K 9/00295* (2013.01); *G06K 9/00228* (2013.01); *G06K 9/6857* (2013.01)

(58) Field of Classification Search
CPC ..... G06T 7/004; G06T 7/0042; G06T 7/0044; G06K 9/00221; G06K 9/00228; G06K 9/00248; G06K 9/00261; G06K 9/00295; G06K 9/3241
USPC ........... 348/135, 143–160, 169–172; 382/103
See application file for complete search history.

(56) References Cited

U.S. PATENT DOCUMENTS

| | | | |
|---|---|---|---|
| 6,028,626 A * | 2/2000 | Aviv | 348/152 |
| 6,297,846 B1 * | 10/2001 | Edanami | 348/239 |
| 6,404,900 B1 * | 6/2002 | Qian et al. | 382/103 |
| 7,139,411 B2 * | 11/2006 | Fujimura et al. | 382/103 |
| 7,158,657 B2 * | 1/2007 | Okazaki et al. | 382/118 |
| 7,218,759 B1 * | 5/2007 | Ho et al. | 382/118 |
| 7,315,631 B1 | 1/2008 | Corcoran et al. | |
| 7,366,330 B2 | 4/2008 | Ito | |

(Continued)

FOREIGN PATENT DOCUMENTS

| | | |
|---|---|---|
| CN | 1484444 A | 3/2004 |
| JP | 4034671 A | 2/1992 |

(Continued)

OTHER PUBLICATIONS

European Search Report for European Application No. 09152861.2 dated Mar. 19, 2012 (9 pages).

(Continued)

*Primary Examiner* — Waseem Ashraf
(74) *Attorney, Agent, or Firm* — Osha Liang LLP (57) ABSTRACT

A target image detection device for detecting a target image from an original image has an acquiring section for acquiring the original image, a determining section for determining a detection condition different from a detection condition of a previous time of a plurality of detection conditions for detecting the target image, a detecting section for detecting the target image with the detection condition determined by the determining section with respect to the original image acquired by the acquiring section, and an output section for outputting a detection result detected by the detecting section.

14 Claims, 7 Drawing Sheets

(56) References Cited

U.S. PATENT DOCUMENTS

| | | | |
|---|---|---|---|
| 7,564,486 B2* | 7/2009 | Ikeda | 348/222.1 |
| 7,646,908 B2* | 1/2010 | Onishi | 382/154 |
| 7,801,330 B2* | 9/2010 | Zhang et al. | 382/103 |
| 7,873,221 B2 | 1/2011 | Okada et al. | |
| 8,055,029 B2* | 11/2011 | Petrescu et al. | 382/118 |
| 8,179,440 B2* | 5/2012 | Ran et al. | 348/159 |
| 8,208,028 B2* | 6/2012 | Yamazaki | 348/169 |
| 2003/0208335 A1* | 11/2003 | Unuma et al. | 702/141 |
| 2004/0032494 A1 | 2/2004 | Ito et al. | |
| 2004/0081338 A1* | 4/2004 | Takenaka | 382/118 |
| 2005/0074164 A1* | 4/2005 | Yonaha | 382/162 |
| 2005/0094854 A1 | 5/2005 | Kim | |
| 2005/0212913 A1* | 9/2005 | Richter | 348/170 |
| 2006/0029265 A1 | 2/2006 | Kim et al. | |
| 2006/0067571 A1* | 3/2006 | Onishi | 382/149 |
| 2006/0140471 A1 | 6/2006 | Murakami et al. | |
| 2006/0140614 A1 | 6/2006 | Kim et al. | |
| 2006/0203090 A1* | 9/2006 | Wang et al. | 348/143 |
| 2007/0019863 A1 | 1/2007 | Ito | |
| 2007/0110321 A1 | 5/2007 | Okada et al. | |
| 2007/0127774 A1* | 6/2007 | Zhang et al. | 382/103 |
| 2007/0206836 A1* | 9/2007 | Yoon et al. | 382/104 |
| 2007/0230798 A1* | 10/2007 | Naylor et al. | 382/219 |
| 2007/0291984 A1* | 12/2007 | Yang et al. | 382/103 |
| 2008/0037838 A1 | 2/2008 | Ianculescu et al. | |
| 2008/0219517 A1* | 9/2008 | Blonk et al. | 382/118 |
| 2008/0294013 A1* | 11/2008 | Gobeyn et al. | 600/300 |
| 2009/0041312 A1* | 2/2009 | Wakasugi | 382/118 |
| 2009/0092283 A1* | 4/2009 | Whillock et al. | 382/103 |
| 2009/0189984 A1* | 7/2009 | Yamazaki | 348/161 |
| 2009/0245573 A1* | 10/2009 | Saptharishi et al. | 382/103 |
| 2009/0263022 A1* | 10/2009 | Petrescu et al. | 382/195 |
| 2010/0142809 A1* | 6/2010 | Won et al. | 382/165 |

FOREIGN PATENT DOCUMENTS

| | | | |
|---|---|---|---|
| JP | 2004140693 A | | 5/2004 |
| JP | 2006172358 A | | 6/2006 |
| JP | 2006208362 A | | 8/2006 |
| JP | 2006254321 A | | 9/2006 |
| JP | 2006-301847 A | | 11/2006 |
| JP | 2007094536 A | | 4/2007 |
| JP | 2007-135115 A | | 5/2007 |
| JP | 2007235640 A | * | 9/2007 |
| JP | 2007281798 A | | 10/2007 |
| JP | 2007-287093 A | | 11/2007 |
| JP | 2007293475 A | | 11/2007 |
| JP | 2008009849 A | | 1/2008 |
| JP | 2008027058 A | | 2/2008 |
| KR | 10-0608596 | | 7/2006 |

OTHER PUBLICATIONS

EPO Abstract Publication No. 2007135115 dated May 31, 2007 (1 page).

EPO Abstract Publication No. 2006301847 dated Nov. 2, 2006 (1 page).

Li, Stan Z.; "Handbook of Face Recognition"; Springer, New York, US; XP002671158; 2005; pp. 26-29 (4 pages).

Office Action Issued in Japanese Application No. 2008-066775, Dated Jun. 26, 2012 (6 Pages With Machine Translation), English Patent Abstract of JP 2008-027058, Publication Date Feb. 7, 2008 (1 Page).

Englgh Patent Abstract of JP 4-034671, Publication Date Feb. 5, 1992 (1 Page).

* cited by examiner

TARGET IMAGE DETECTION DEVICE, CONTROLLING METHOD OF THE SAME, CONTROL PROGRAM AND RECORDING MEDIUM RECORDED WITH PROGRAM, AND ELECTRONIC APPARATUS EQUIPPED WITH TARGET IMAGE DETECTION DEVICE

BACKGROUND OF THE INVENTION

1. Technical Field

The present invention relates to a target image detection device for detecting a target image from an original image, a controlling method of the same, a control program and a recording medium recorded with the program, and an electronic apparatus equipped with the target image detection device.

2. Related Art

Conventionally, needs for automatically recognizing a photographing target or a displaying target to provide an easy-to-use user interface or to automatically acquire an optimum image are increasing in an imaging device, a display device, and the like. One example of such needs includes a function of detecting a face of a person and making an adjustment such that an optimum focus and exposure are obtained on the detected face, or recognizing a character and automatically having a region of the recognized character as a target of OCR (Optical Character Recognition).

Generally, in order to realize such a function, an advanced image processing is required, and an enormous amount of calculation is required. The above-described function generally requires real-time performance, and thus high-speed processing is necessary. It is thus often difficult to realize such a function in an incorporating device where processing ability, power consumption, and cost are restricted such as a digital camera or a mobile communication terminal.

Various methods for increasing the speed of processing have been proposed for such a problem. For instance, in an image processing device described in Japanese Unexamined Patent Publication No. 2007-135115, reduced images are sequentially template matched in an order a resolution sequentially changes in a step-wise manner, a region in which a specific subject is photographed is detected, and the processing is interrupted after the detection to increase the speed of the processing. Furthermore, in a face detection method described in Japanese Unexamined Patent Publication No. 2006-301847, the faces are detected in order from large faces, and detection is subsequently continued excluding the region where a face is already detected from the detecting target region. The detecting target region thus can be reduced every time a face is detected, and the speed of processing can be increased.

SUMMARY

The image processing device of Japanese Unexamined Patent Publication No. 2007-135115 is provided to track a movement of a specific subject. Thus, in a process of detecting a region in which unspecified and undetermined number of subjects are photographed, it is difficult to interrupt the processing after the detection, and it is difficult to achieve higher speed of the processing. Furthermore, in the face detection method of Japanese Unexamined Patent Publication No. 2006-301847, the detection of the face with respect to the detecting target region is repeated in order from a large face to a small face, and thus the processing still takes time.

The present invention has been devised to solve the problems described above, and an object thereof is to provide a target image detection device capable of rapidly outputting the detection result, and the like.

In accordance with one aspect of the present invention, a target image detection device according to the present invention is a target image detection device for detecting a target image from an original image, which includes, in order to solve the above problem, acquiring means for acquiring the original image; determining means for determining a detection condition different from a detection condition of a previous time of a plurality of detection conditions for detecting the target image; detection means for detecting the target image with the detection condition determined by the determining means with respect to the original image acquired by the acquiring means; and output means for outputting a detection result detected by the detection means.

In accordance with another aspect of the present invention, a controlling method of the target image detection device according to the present invention detects a target image from an original image, which includes the steps of, in order to solve the above problem, acquiring the original image; determining a detection condition different from a detection condition of a previous time of a plurality of detection conditions for detecting the target image; detecting the target image with the detection condition determined in the determining step with respect to the original image acquired in the acquiring step; and outputting a detection result detected in the detection step.

Examples of the target to be detected include a moving object or one part thereof such as a face, an upper body, and an entire body of a person, a ball, and a vehicle.

According to the above configuration and method, when the original image is acquired, the target image is detected with respect to the acquired original image with the detection condition different from the detection condition of the previous time of the plurality of detection conditions for detecting the target image, and the detection result is output. Therefore, the detection result can be output in a short period of time, although the detection result is of one part of the target image, compared to the related art of detecting the target image respectively for the plurality of detection conditions for detecting the target image with respect to a certain original image, and outputting all detection results together. As a result, the output detection result can be rapidly used by another device (e.g., device for controlling display, device for controlling photographing, and the like).

In accordance with still another aspect of the present invention, the target image detection device according to the present invention further includes a result history storage section for storing a history of the detection result detected by the detection means, where the determining means may further determine the detection condition based on the history of the detection result in the result history storage section. Alternatively, in the target image detection device according to the present invention, the determining means may sequentially determine the detection condition from the plurality of detection conditions for detecting the target image.

In sequential determination, all detection results of the target image can be output, similar to the related art, for all of the plurality of detection conditions. Furthermore, when the original image is a plurality of still images contained in the moving image, and the subsequent still image is acquired before all detection results of a certain still image is output in the related art, the detection result with respect to the subsequent still image can be output in the present invention, and thus the detection result with respect to a new target image can be included as opposed to the related art.

When determining the detection condition based on the history of the detection result, for example, consideration is made in increasing a frequency of determining the detection condition having a high possibility of detecting the target image as the determining condition, and reducing the frequency of determining the detection condition having a low possibility of detecting the target image as the determining condition. Therefore, efficiency of detecting the target image enhances.

Since the detecting target is the object that moves, or the like, a position of the target image may shift from a detection position with elapse of time if the original image is a plurality of still images contained in the moving image.

Preferably, in the target image detection device according to the present invention, the acquiring means acquires a plurality of still images contained in the moving image as the original image, tracking means for tracking, with respect to the original image of a certain time point acquired by the acquiring means, the target image detected by the detection means in the original image at a time point after the time point is further arranged, and the output means further outputs the tracking result tracked by the tracking means.

In this case, the target image that has once been detected is tracked and the tracking result is output, and thus the above-mentioned problems can be avoided. The tracking means may track the target image based on the tracking condition. The tracking condition may be acquired from the detection condition.

In the present invention, the target image is detected with some of the detection conditions and the detection result is output, and thus a case in which an accuracy of the detection result is low sometimes arises compared to the related art of detecting the target image with all the detection conditions and then outputting the detection result.

Thus, the target image detection device according to the present invention preferably further includes correction means for correcting the tracking result tracked by the tracking means based on the detection result detected by the detection means, and the output means outputs the tracking result corrected by the correction means instead of the tracking result tracked by the tracking means.

In this case, the detection results with different detection conditions can be reflected on the tracking result, and thus the accuracy of the detection result can be gradually enhanced. The correction means may also be corrected based on the history of the detection result.

The above-described effects can be obtained even with an electronic apparatus arranged with the target image detection device having the above configuration.

Furthermore, the electronic apparatus may further include a display unit for displaying information, and image synthesizing means for synthesizing the image indicating the detection result detected by the target image detection device to the original image, and displaying on the display unit. In this case, the start of display of the image indicating the detection result can be rapidly performed, although partial, and the images indicating the remaining detection results can be sequentially displayed thereafter. As a result, the time the user waits for the detection of the target image can be reduced compared to the related art of displaying the images showing all the detection results together. Furthermore, since the image indicating the detection result is sequentially displayed, a new entertainment can be provided to the user. Moreover, since the remaining detection results are with respect to the original image after the original image on which the first detection is performed, shift between the image indicating the relevant detection result and the image indicating the detection result of when the target image is detected with respect to the original image currently being displayed can be suppressed.

Each means in the target image detection device can be executed on a computer by a control program. Furthermore, the control program can be executed on an arbitrary computer by storing the control program in a computer recordable recording medium.

Therefore, when acquiring the original image, the target image detection device according to the present invention detects the target image with respect to the acquired original image with the detection condition different from the detection condition of the previous time of a plurality of detection conditions for detecting the target image, and outputs the detection result, and thus the detection result, although the detection result is of a part of the target image, can be output in a short period of time compared to the related art, and as a result, the output detection result can be rapidly used in another device.

DETAILED DESCRIPTION

First Embodiment

Figure 1:
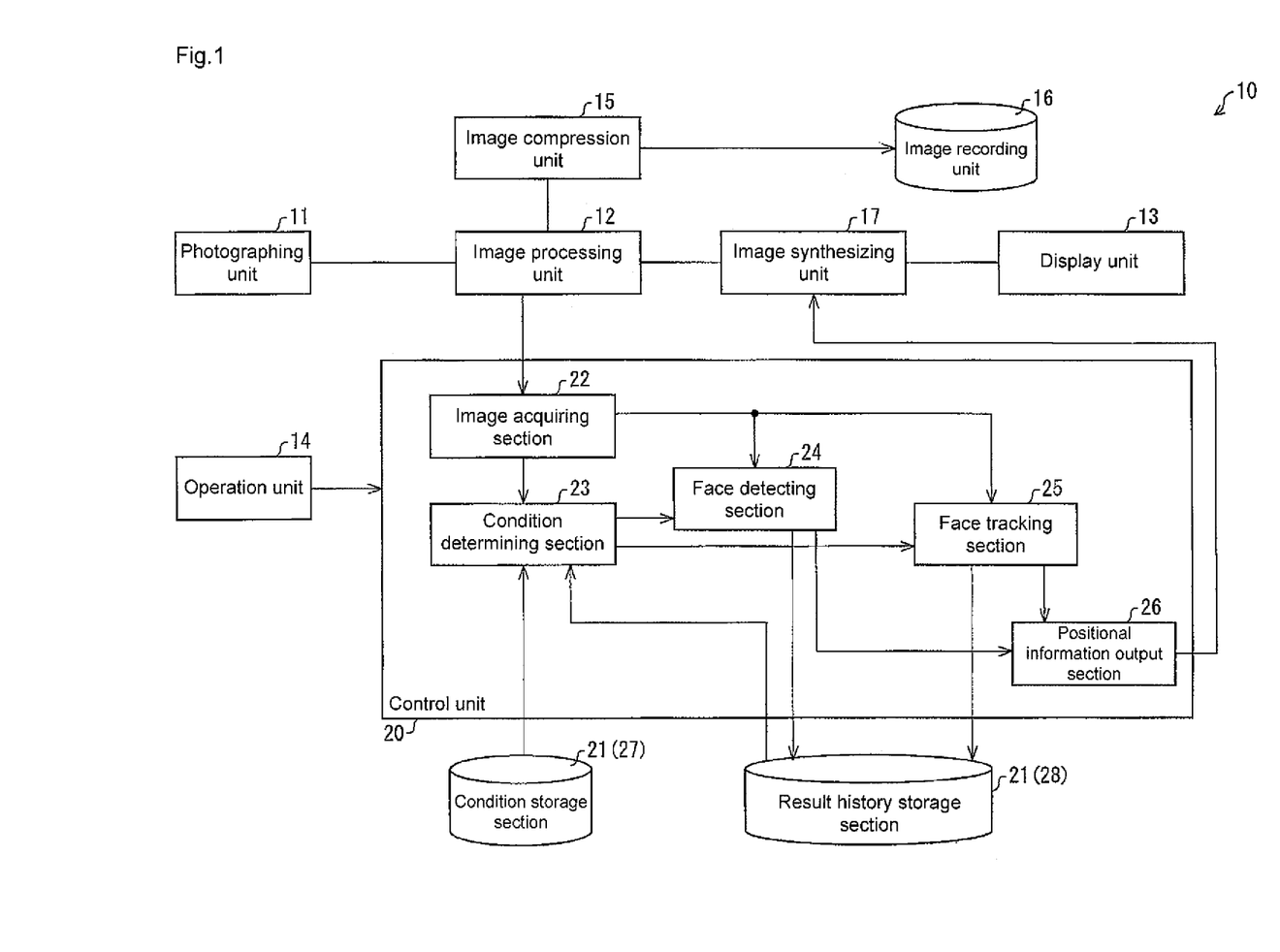
FIG. 1 is a block diagram showing a schematic configuration of a digital camera according to one embodiment of the present invention.

One embodiment of the present invention will be described with reference to FIGS. 1 to 4. FIG. 1 shows a schematic configuration of a digital camera according to the present embodiment. As shown in the figure, in a digital camera (electronic apparatus) 10, a photographed image (original image) photographed with a photographing unit 11 and image processed in an image processing unit 12 is displayed on a display unit 13 as a live view image. Furthermore, in the digital camera 10, when a user pushes a shutter button (not shown) of an operation unit 14, the photographed image that is image processed in the image processing unit 12 is image compressed in an image compression unit 15, and then stored in an image storage unit 16.

The digital camera 10 of the present embodiment first acquires the photographed image that is image processed in the image processing unit 12, and changes the detection condition to a detection condition different from the detection condition of the previous time of a plurality of detection conditions for detecting a face image (target image). The digital camera 10 then detects the face image with the changed detection condition with respect to the acquired photographed image. A frame image surrounding a region of the detected face image is then generated, and the generated frame image is synthesized with the photographed image in an image synthesizing unit (image synthesizing means) 17, and displayed on the display unit 13 as the live view image.

Therefore, although the detection result is of one part of the face image, such a detection result is output in a short period of time compared to the related art. Consequently, the frame image can be rapidly displayed using the output detection result. A face image is then detected in another different detection condition with respect to the subsequent photographed image, and a different detection result is output in a short period time. Therefore, if the photographed image is a moving image, the number of frame images gradually increases, and thus a state of display of the frame image becomes smooth compared to the related art.

The digital camera 10 of the present embodiment will now be described in detail. As described above, the digital camera 10 includes the photographing unit 11, the image processing unit 12, the display unit 13, the operation unit 14, the image compression unit 15, the image recording unit 16, and the image synthesizing unit 17. The digital camera 10 also includes a control unit (target image detection device) 20 and a storage unit 21, as shown in FIG. 1.

The photographing unit 11 photographs a subject, and includes, for example, an optical system such as a lens group, an aperture, and an imaging element, and a circuit system such as an amplifier and an A/D converter. Examples of the imaging element include a CCD, CMOS (Complementary Metal-Oxide Semiconductor) image sensors and the like. The photographing unit 11 generates a photographed image by photographing, converts the photographed image to data of the photographed image, and transmits the data to the image processing unit 12.

The image processing unit 12 performs image processing such as matrix calculation, γ correction, adjustment of white balance, or the like on the data of the photographed image from the photographing unit 11. The image processing unit 12 also generates data of the photographed image for display, for recordation, and for face detection from the data of the photographed image subjected to image processing, and transmits such data respectively to the display unit 13, the image compression unit 15, and the control unit 20. The data of the photographed image for display and for face detection may be the same.

The image synthesizing unit 17 synthesizes an image based on instruction from the control unit 20 to the photographed image from the image processing unit 12. The image synthesizing unit 17 transmits the data of the synthesized image to the display unit 13.

In the present embodiment, the image synthesizing unit 17 receives positional information of a face image detected by the control unit 20, and generates a frame image such as a rectangular image or a circular image appropriately surrounding the face image based on the received positional information. The image synthesizing unit 17 also receives the positional information of a face image tracked by the control unit 20, and generates a frame image appropriately surrounding the face image based on the received positional information. The image synthesizing unit 17 then synthesizes the generated frame image to the photographed image from the image processing unit 12. The data of the synthesized image that has been synthesized is transmitted to the display unit 13 to be displayed on the display unit 13.

The frame image related to the face image detected by the control unit 20 and the frame image related to the face image tracked by the control unit 20 may be the same or may be different. The frame image merely needs to be a figure that can indicate that the face image is contained on an inner side, and may be, for example, an image that displays only the vicinity of a vertex of the rectangle.

The display unit 13 is configured by a display device such as an LCD (Liquid Crystal Display element), a CRT (Cathode Ray Tube), or a plasma display. The display unit 13 displays and outputs various information such as a character and an image based on the data of the synthesized image from the image synthesizing unit 17.

The operation unit 14 accepts various inputs from the user by the operation of the user, and is configured by an input button, a touch panel, and other input devices. The operation unit 14 converts the information operated by the user to operation data, and transmits the same to the control unit 20. Other examples of the input device include a keyboard, a ten key, and a pointing device such as a mouse.

The image compression unit 15 compresses the data of the photographed image from the image processing unit 12 according to methods such as JPEG and MPEG. The image compression unit 15 records the compressed data of the photographed image in the image recording unit 16.

The image recording unit 16 records information, and in particular, records the data of the photographed image compressed by the image compression unit 15. The image recording unit 16 is configured by a non-volatile storage device such as a flash memory and a hard disc.

The control unit 20 controls in an integrated manner the operation of various configurations in the digital camera 10. The control unit 20 is configured by a computer including, for example, a CPU (Central Processing Unit) and a memory. The operation control of various configurations is performed by executing a control program by means of a computer. This program may be in a form of reading and using the program recorded on a removable media such as a flash memory, or may be in a form of reading and using the program installed in a hard disc, or the like. A form of downloading the program and installing in the hard disc, or the like and executing is also considered. The details of the control unit 20 will be hereinafter described.

The storage unit 21 is configured by a non-volatile storage device such as a flash memory, a ROM (Read Only Memory) or the like, and a volatile storage device such as a RAM (Random Access Memory). Contents stored in the non-volatile storage device includes the above-described control program, an OS (Operating System) program, other various programs, operation set values in the image processing unit 12, input character data, and the like. The operation set value in the image processing unit 12 includes a value of white balance set at the time of device shipment or at the time of maintenance, various parameter values related to image processing when adjusting a tone of the photographed image, and the like. The content stored in the volatile storage device includes a working file, a temporary file, and the like. The details of the storage unit 21 will be hereinafter described.

In the present embodiment, the control unit 20 has a face detection function of detecting a face image from the photographed image with respect to the moving image including a plurality of photographed images in time-series order, and a face tracking function of tracking the face image by detecting the detected face image from the subsequent photographed image. In the detection of the face image, the known face detection technique such as using template matching, detecting a skin color region, detecting a contour of the face, or detecting a feature point of the face may be used.

FIG. 1 shows a configuration related to the face detection function and the face tracking function in the control unit 20 and the storage unit 21. As shown in the figure, the control unit 20 is configured to include an image acquiring section (acquiring means) 22, a condition determining section (determining means) 23, a face detecting section (detection means) 24, a face tracking section (tracking means) 25, and a positional information output section (output means) 26. The storage unit 21 is configured to include a condition storage section 27 and a result history storage section 28.

Figure 2A:
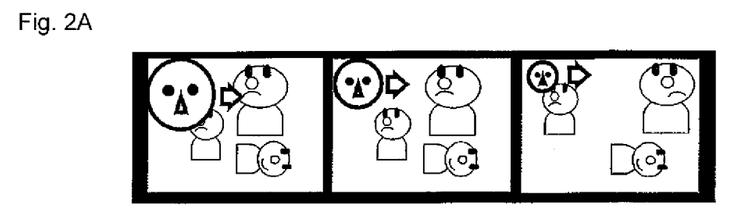
FIGS. 2A to 2E are views showing examples of a detection condition of face detection.
Figure 2B:
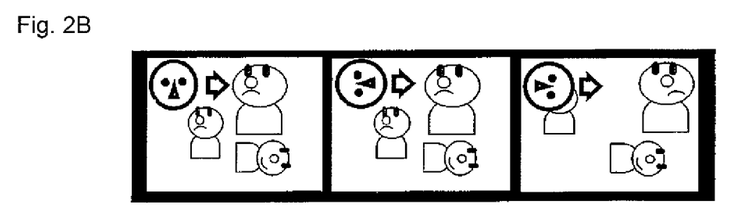
Figure 2C:
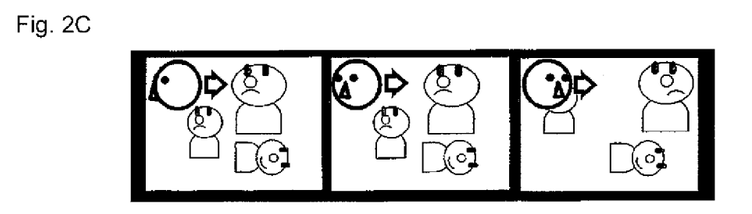

The condition storage section 27 stores in advance a plurality of detection conditions (hereinafter referred to as "detection condition of face detection") for detecting the face image. FIGS. 2A to 2E show an example of the detection condition of the face detection. An arrow in the figure shows a scanning direction of a template. FIG. 2A shows a template used in the template matching, where a plurality of templates having different sizes are shown. FIG. 2B shows a plurality of templates of when rotation (RIP (Rotation In Plane)) in the image is performed on the template. FIG. 2C shows a plurality of templates when an observing direction is changed (ROP (Rotation Off Plane)) with respect to the template.

Figure 2D:
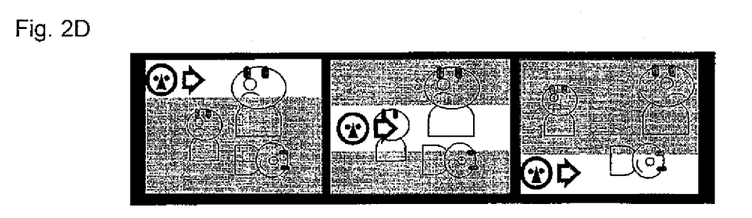
Figure 2E:
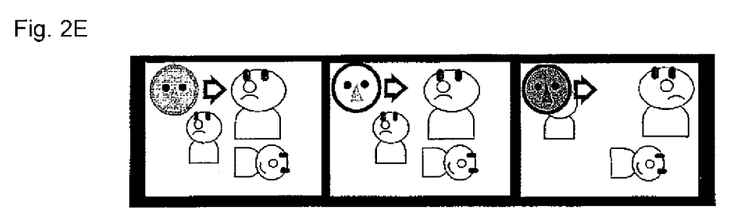

FIG. 2D shows a plurality of search regions for performing the search with the template in the photographed image, which becomes the target of face detection. FIG. 2E shows a plurality of templates having different feature quantities. Other detection conditions include a plurality of image filters for satisfactorily performing face detection, a plurality of similarity calculation methods for calculating the similarity with the template, and the like.

Assume a person barely moved in a very short period of time of one or a few frames. The face image detected in a certain photographed image is assumed to be detected with the detection condition the same as or similar to the detection condition of the previous time in the vicinity of a position of the face image detected the previous time in the subsequent photographed image. Therefore, the tracking condition for tracking the face image is contained in the detection condition for detecting the face image.

The result history storage section 28 stores the detection result and the detection condition of the above-described face detection, and the tracking result and the detection condition of the above-described face tracking as result history. The detection result and the tracking result may be a detected date and time, a size, positional information, and the like of the detected face image.

The image acquiring section 22 acquires the data of the photographed image from the image processing unit 12. When acquiring the data of the photographed image, the image acquiring section 22 notifies that the data of the photographed image is acquired to the condition determining section 23, and also transmits the acquired data of the photographed image to the face detecting section 24 and the face tracking section 25.

When receiving the notification from the image acquiring section 22, the condition determining section 23 references the detection condition of the result history storage section 28, and determines the detection condition different from the detection condition of the previous time from the plurality of detection conditions in the condition storage section 27. In the present embodiment, the condition determining section 23 sequentially determines the plurality of detection conditions necessary for detecting all the face images from the photographed image. The condition determining section 23 transmits the determined detection condition to the face detecting section 24.

When receiving the notification from the image acquiring section 22, the condition determining section 23 determines the tracking condition based on the detection history and the tracking history of the face image in the result history storage section 28. The condition determining section 23 transmits the determined tracking condition to the face tracking section 25. The condition determining section 23 may use the plurality of detection conditions in the condition storage section 27 when determining the tracking condition.

When receiving the data of the photographed image from the image acquiring section 22, the face detecting section 24 detects the face image from the photographed image based on the detection condition from the condition determining section 23. The face detecting section 24 transmits the detection result to the positional information output section 26, and stores the detection result and the detection condition in the result history storage section 28. The specific process of the face detection performed by the face detecting section 24 is similar to the related art, and thus the description thereof will not be given.

When receiving the data of the photographed image from the image acquiring section 22, the face tracking section 25 tracks the face image from the photographed image based on the tracking condition from the condition determining section 23. Specifically, the face tracking section 25 detects the face image detected the previous time from the photographed image based on the detection condition suited for the face tracking from the condition determining section 23. The face tracking section 25 transmits the tracking result to the positional information output section 26 and stores the tracking result and the tracking condition in the result history storage section 28. The specific process of the face tracking performed by the face tracking section 25 is similar to the related art, and thus the description thereof will not be given.

The positional information output section 26 outputs the positional information of the detected face image to the image synthesizing unit 17 based on the detection result from the face detecting section 24. The positional information output section 26 outputs the positional information of the tracked face image to the image synthesizing unit 17 based on the tracking result from the face tracking section 25.

The positional information of the face image output by the positional information output section 26 may be arbitrary information as long as it is information that can specify the region of the face image in the photographed image. Examples of positional information of the face image include a combination of a central coordinate and a width in the region of the face image, a combination of coordinates of four vertices of the rectangle indicating a boundary of the region of the face image, and the like.

Figure 3:
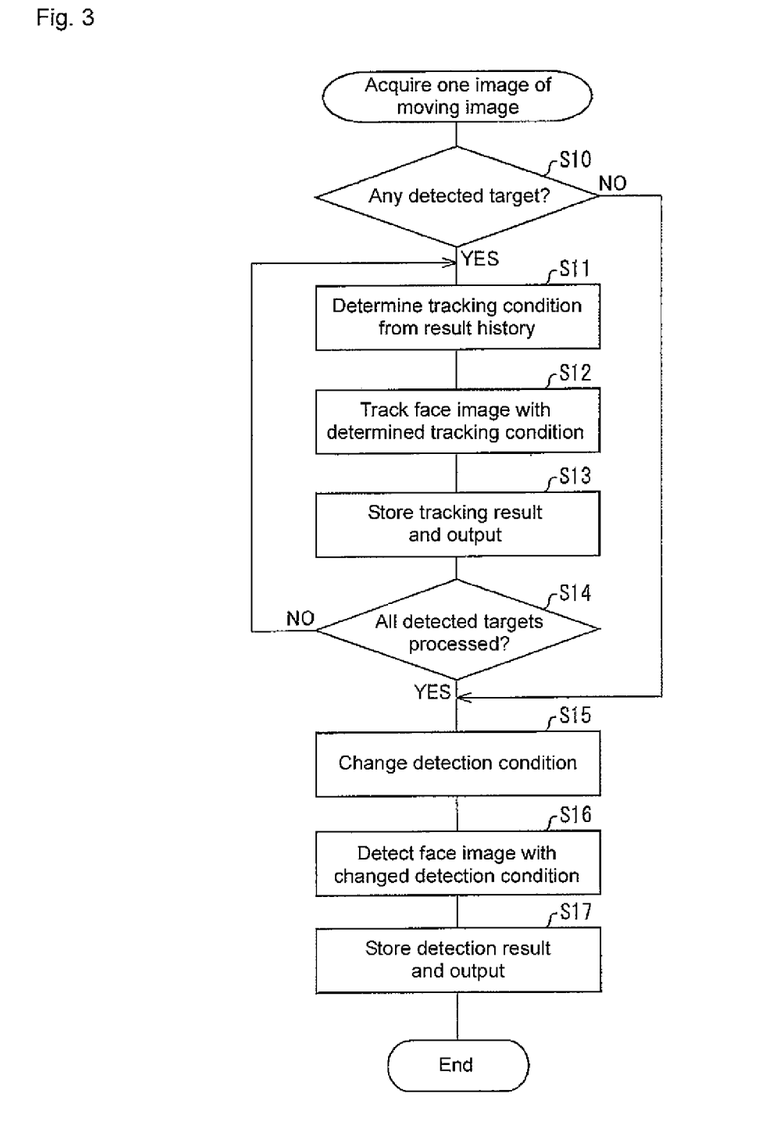
FIG. 3 is a flowchart showing a processing operation of a face detection process and a face tracking process in the digital camera.

FIG. 3 shows a processing operation of the face detection process and the face tracking process in the digital camera 10 having the above configuration. As shown in the figure, when the image acquiring unit 22 acquires one photographed image in a moving image photographed by the photographing unit 11, the condition determining section 23 references the detection history and the tracking history of the face image, which are the result history, in the result history storage section 28 and determines whether or not the detected face image (detected target) exists (step S10: hereinafter sometimes simply referred to as "S10", and this is the same in other steps). If the detected target does not exist, the process proceeds to step S15.

If the detected target exists, the condition determining section 23 determines the tracking condition from the result history (S11), and the face tracking section 25 tracks the detected face image with the determined tracking condition (S12). The face tracking section 25 then stores the tracking result and the tracking condition in the result history storage section 28, and the positional information output section 26 outputs the positional information of the face image based on the tracking result to the image synthesizing unit 17 (S13). The image synthesizing unit 17 generates a frame image related to the face image tracked by the face tracking section 25, synthesizes the generated frame image and the photographed image, and displays and outputs the same to the display unit 13.

The condition determining section 23 then determines whether or not all the detected targets are processed (S14). If all the detected targets are not processed, the process returns to step S11 and the above-described processing operations are repeated. If all the detected targets are processed, the process proceeds to step S15.

In step S15, the condition determining section 23 references the detection condition in the result history storage section 28, and changes the detection condition from the detection condition of the previous time. The face detecting section 24 then detects a face image with the changed detection condition (S16). The face detecting section 24 stores the detection result and the detection condition in the result history storage section 28, and the positional information output section 26 outputs the positional information of the face image based on the detection result to the image synthesizing unit 17 (S17). The image synthesizing unit 17 then generates a frame image related to the face image detected by the face detecting section 24, synthesizes the generated frame image and the photographed image, and displays and outputs the same through the display unit 13. The processing operation is thereafter terminated.

Figure 4A:
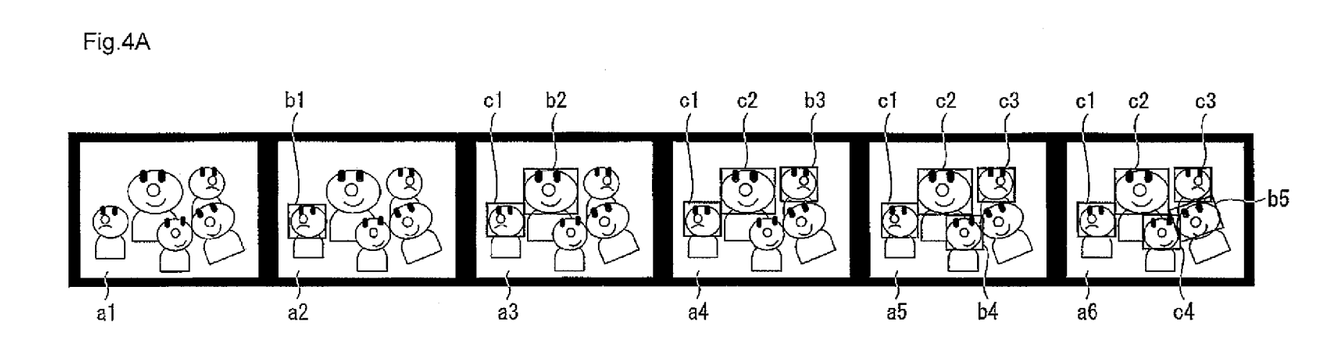
FIGS. 4A and 4B are views showing, in time-series, an example of a synthesized image displayed in the digital camera and a comparative example of a synthesized image displayed by the related art.
Figure 4B:
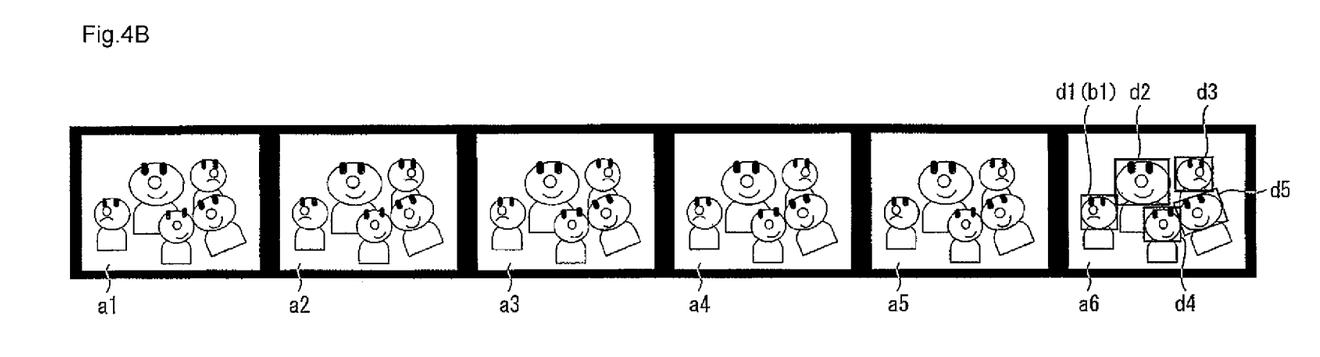

FIGS. 4A and 4B show examples of the synthesized image. FIG. 4A shows, in time-series, an example of the synthesized image displayed in the digital camera 10 of the present embodiment. FIG. 4B shows, in time-series, an example of the synthesized image displayed in a conventional digital camera, as a comparative example. In the illustrated example, the number of detection conditions for performing all the face detections is five.

In the present embodiment, the face detection is performed with a first detection condition with respect to a first photographed image a1, and a rectangular frame image b1 surrounding the detected face image is synthesized and displayed in a second photographed image a2, as shown in FIG. 4A. The face detection is then performed with a second detection condition, different from the first detection condition, on the second photographed image a2, and a rectangular frame image b2 surrounding the detected face image is synthesized and displayed in a third photographed image a3. The face tracking is performed with the tracking condition suited to the face image surrounded by the frame image b1 with respect to the second photographed image a2, and a rectangular frame image c1 surrounding the tracked face image is synthesized and displayed in the third photographed image a3.

The face detection is performed with a third detection condition, different from the first and the second detection conditions, with respect to the third photographed image a3, and a rectangular frame image b3 surrounding the detected face image is synthesized and displayed in a fourth photographed image a4. The face tracking is performed with the tracking condition suited to the two face images respectively surrounded by the frame images c1, b2 with respect to the third photographed image a3, and the rectangular frame images c1, c2 surrounding the tracked face images are synthesized and displayed in the fourth photographed image a4.

The face detection is performed with a fourth detection condition, different from the first to the third detection conditions, with respect to the fourth photographed image a4, and a rectangular frame image b4 surrounding the detected face image is synthesized and displayed in a fifth photographed image a5. The face tracking is performed with the tracking condition suited to the three face images respectively surrounded by the frame images c1, c2, b3 with respect to the fourth photographed image a4, and the rectangular frame images c1 to c3 surrounding the tracked face image are synthesized and displayed in the fifth photographed image a5.

The above procedure is subsequently repeated so that a sixth photographed image a6, a frame image b5 surrounding the face image detected in the fifth photographed image a5, and the rectangular frame images c1 to c4 surrounding the face images tracked in the fifth photographed image a5 are synthesized and displayed. In other words, the frame images c1 to c4, b5, which are the result of performing the face detection with all the detection conditions, are displayed in the sixth synthesized image.

Conventionally, the face detection is performed in order with the first to the fifth detection conditions with respect to the first photographed image a1, and the rectangular frame images d1 to d5 surrounding all the detected face images are synthesized with the photographed image and displayed after the termination of the face detection, as shown in FIG. 4B. Thus, it takes time until the frame images d1 to d5 are displayed. In the illustrated example, the frame images d1 to d5 by the face detection on the first photographed image a1 are synthesized and displayed with the sixth photographed image a6.

In FIG. 4, the position of each subject in the photographed image is the same among the photographed images a1 to a6, but actually, the subject moves and thus the position often differs among the photographed images a1 to a6, and the shift tends to become large with elapse of time.

Comparing FIGS. 4A and 4B, it should be recognized that the frame image indicating the result of the face detection and the face tracking starts to be rapidly displayed, although partially, and thus the time the user waits for the detection of the face image can be reduced in the present embodiment than in the related art. As the number of frame images gradually increases, the state of display of the frame image becomes smoother compared to the related art. Furthermore, it should be recognized that a new entertainment can be provided to the user as the frame images indicating the remaining results of the face detection and the face tracking are sequentially displayed.

In the present embodiment, the face detection with the second detection condition is performed on the second photographed image a2, and the frame image b2 indicating the detection result is synthesized with the next (third) photographed image a3, as shown in FIG. 4A. In the related art, on the other hand, the face detection with the second detection condition is performed on the first photographed image a1, and the frame image d2 indicating the detection result is synthesized with the sixth photographed image a6, as shown in FIG. 4B.

Therefore, the period between the photographed time of the photographed image, which is the target of face detection, and the photographed time of the photographed image to which the frame image indicating the detection result is to be synthesized is short in the present embodiment than in the related art, and thus it can be recognized that the shift between the frame image and the face image in the photographed image to be synthesized with the frame image becomes small.

Furthermore, in the present embodiment, the frame images c1 to c4 of the frame images synthesized with the sixth photographed image a6 relate to the face images continuously tracked after being detected once with respect to the photographed images up to the fifth photographed image, and the frame image b5 relates to the face image detected with respect to the fifth photographed image, as shown in FIG. 4A. In other words, in the present embodiment, the frame images synthesized with the sixth photographed image a6 relate to the face images in the photographed image a5 immediately before (fifth). In the related art, on the other hand, all the frame images d1 to d5 synthesized with the sixth photographed image a6 relate to the face images detected with respect to the first photographed image a1, as shown in FIG. 4B.

Therefore, the period between the photographed time of the photographed image, which is the source of generating the frame image, and the photographed time of the photographed image to be synthesized with the frame image is short in the present embodiment than in the related art, and thus it should be recognized that the shift between the frame image and the face image in the photographed image to be synthesized with the frame image becomes smaller.

Second Embodiment

Figure 5:
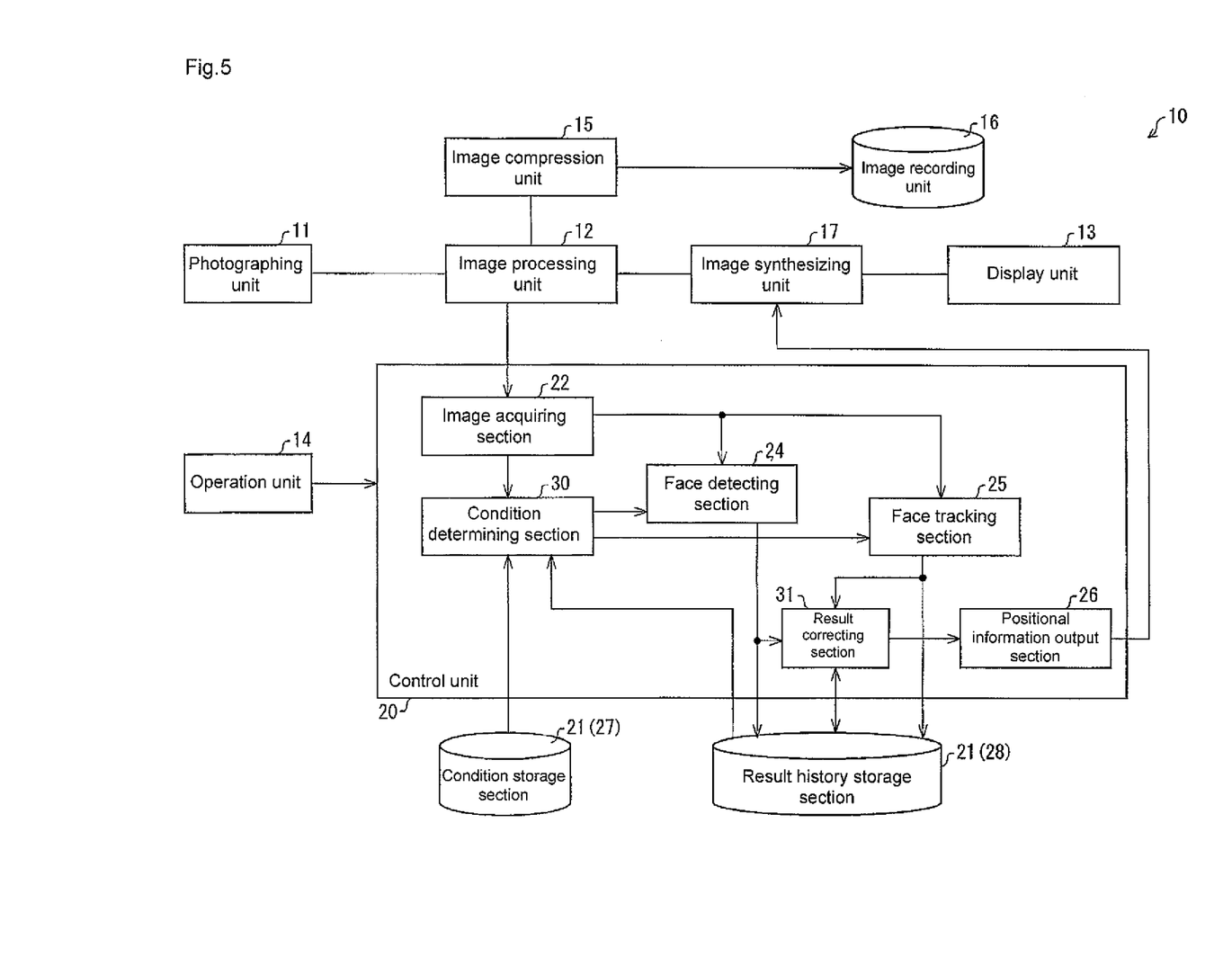
FIG. 5 is a block diagram showing a schematic configuration of a digital camera according to another embodiment of the present invention.

Another embodiment of the present invention will now be described with reference to FIGS. 5 to 7. FIG. 5 shows a schematic configuration of a digital camera according to the present embodiment. The illustrated digital camera 10 differs from the digital camera 10 shown in FIG. 1 in that the function of the condition determining section 30 is different and in that a result correcting section (correction means) 31 is added between the face detecting section 24 and the face tracking section 25, and the positional information output section 26, but other configurations are the same. The configuration and the processing operation similar to the configuration and the processing operation described in the above-described embodiment are denoted with the same reference numerals, and the description thereof will not be given.

The condition determining section 23 shown in FIG. 1 sequentially determines a plurality of detection conditions necessary for detecting all the face images. In this case, all detection results of the face image can be output, similar to the related art, for all of the plurality of detection conditions by acquiring a plurality of photographed images contained in the moving image.

The condition determining section 30 of the present embodiment dynamically changes and determines the detection condition based on the history of the detection result of the result history storage section 28. The information of the condition to be dynamically changed is stored in the condition storage section 27.

For instance, if face detection by a template of the laterally-facing face image as shown in the image on the left side in FIG. 2C is not present in a predetermined period, the detection frequency with the detection condition using the relevant template can be reduced. This is assumed to be because the face of the subject is facing the direction of the digital camera 10 in this case.

When the face image suddenly cannot be detected from the region of the photographed image from which the face image has been detected up to now, the detection frequency with the detection condition of the relevant face image can be increased. This is assumed to be because, in this case, the subject framed out from the digital camera 10 or the subject turned around and the face of the subject is facing the direction opposite to the digital camera 10, and the possibility the relevant face image can be redetected is high.

Therefore, the efficiency of the face detection can be enhanced by dynamically changing the detection condition based on the history of the detection result.

Methods of dynamically changing the detection condition based on the history of the detection result will be collectively described below. A first method is to change the usage frequency of the detection condition according to the number of detection times up to now by a certain detection condition. For instance, if the number of detection times in a certain region of the photographed image is large, the frequency of using such region as the detection condition can be increased. Furthermore, if the number of detection times of a certain direction of the face is small, the frequency of using the template of such direction as the detection condition can be decreased.

A second method is to change the usage frequency and/or the combination of the detection condition according to the combination of the detection condition. For instance, if the number of times of simultaneously detecting the face image at the lower right region and the upper left region in the photographed image is small, when the face image is detected in one region, the frequency of using the other region as the detection condition can be reduced. Furthermore, if the possibility of simultaneously detecting the face image of a first direction and the face image of a second direction, which is rotated by 180 degrees in the image from the first direction, is low, when the face image of the first direction is detected, the frequency of using the second direction as the detection condition can be reduced.

If tendency exists in the size of the face image to be detected according to the region in the photographed image such as when the face image of 30 pixels is great in number at a central region of the photographed image and the face image of 20 pixels is great in number at a peripheral edge region, the frequency of using the size of the face image as the detection condition can be changed depending on the region.

A third method is to change the order of the detection condition based on regularity when regularity exists in the order of the detection conditions. For instance, if the size of the face image detected once tends to become small with time, the size of the face image can be used as the detection condition in order from the larger size to the smaller size. If the face image detected once is lost and such face image is assumed to reappear with the same detection condition in a short period, the frequency of using the relevant detection condition can be increased for a short period.

The result correcting section 31 corrects the tracking result from the face tracking section 25 based on the detection result from the face detecting section 24. The result correcting section 31 transmits the corrected detection result and the tracking result to the positional information output section 26.

Conventionally, the face image is detected in order for each of the plurality of detection conditions necessary for detecting all face images from the photographed image, the detection result is corrected based on such plurality of detection results, and the corrected detection result is output. For instance, if both the face image having a size of 20 pixels and the face image having a size of 30 pixels are both detected with respect to a certain region of the photographed image, correction is made to the face image having a size of 25 pixels, which is an average value.

In the present embodiment, when the photographed image is acquired, a part of the plurality of detection conditions is determined, the face image is detected with the determined detection condition, and the detection result is output. Thus, the accuracy of the detection result lowers compared to the related art of correcting the detection result based on the detection result by all of the plurality of detection conditions.

In the present embodiment, the result correcting section 31 corrects the tracking result from the face tracking section 25 based on the detection result from the face detecting section 24. The result correcting section 31 may correct the tracking result from the face tracking section 25 based on the result history of the result history storage section 28.

Figure 7A:
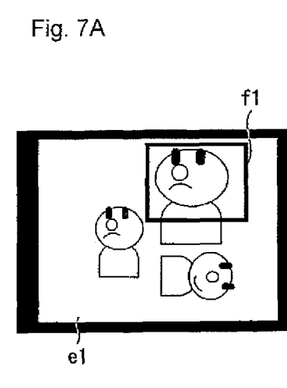
FIGS. 7A to 7C are views describing one example of correcting a tracking result of face tracking in the digital camera.
Figure 7B:
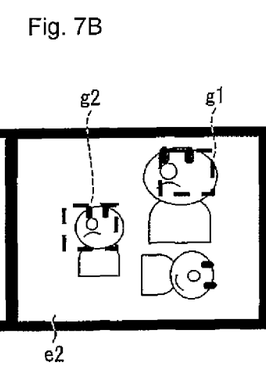
Figure 7C:
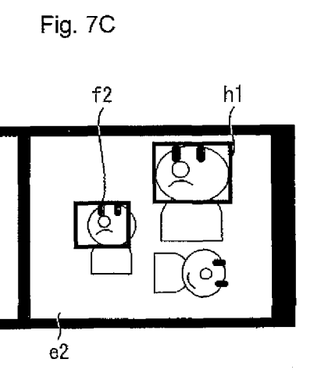

FIGS. 7A to 7C describe one example of the correction of the tracking result. FIG. 7A shows a synthesized image at a certain time point. As shown in the figure, the synthesized image includes a photographed image e1 at a certain time point, and a frame image f1 corresponding to the face image of 30 pixels detected by the face detection with respect to the photographed image (not shown) of immediately before the relevant time point. Suppose the face detecting section 24 performed the face detection using a template of 20 pixels with respect to the photographed image e1 shown in FIG. 7A, and two face images g1, g2 of 20 pixels are detected as shown with a broken line in FIG. 7B. In this case, the face image of 30 pixels surrounded by the frame image f1 and the face image g1 of 20 pixels are detected in a similar region in the photographed image, and thus are assumed to be the same face.

The result correcting section 31 corrects the face image (not shown) of 30 pixels tracked with the tracking condition suited to the face image surrounded by the frame image f1 to the face image of 25 pixels, which is the average of 30 pixels and 20 pixels, with respect to the photographed image e1 shown in FIG. 7A and transmits the correction result to the positional information output section 26. The face image g2 first detected in a region different from the above region is transmitted to the positional information output section 26 without being corrected.

The synthesized image displayed on the display unit 13 in this case is shown in FIG. 7C. As shown in the figure, the configuring image includes the next photographed image e2, the frame image f2 corresponding to the face image of 20 pixels detected by face detection, and a frame image h1 corresponding to the face image of 25 pixels that is tracked by face tracking and corrected, with respect to the photographed image e1. Comparing FIGS. 7A and 7C, it can be recognized that the size of the frame image h1 after the correction is approaching the size of the actual face image compared to the frame image f1 before correction. Therefore, the accuracy of the face image can be gradually enhanced.

The methods of correcting the tracking result based on the detection result will be summarized and described below. The first method is a method of correcting the tracking result with the average of the detection result when the face image presumed as being the same subject is detected with a plurality of detection conditions. For instance, if the number of detection times of the face image in substantially the same region of the photographed image reaches the predetermined number of frames, the size of the face image in the tracking result is corrected with the average value of the size of the detected face images, or the direction of the face image in the tracking result is corrected with the average value of the direction of the detected face images. The tracking position of the face image in the tracking result may be corrected such that a movement focus of the face image presumed to be the same subject becomes smooth.

Another method is to prioritize the detection result of the more appropriate detection condition and correct the tracking result if the face image presumed as being the same subject is detected with a plurality of detection conditions. For instance, if the number of detections decreases by changing the detection condition of the image filter, the detection result of the previous detection condition is assumed as more appropriate, and the weighted average placing greater importance on the relevant detection result is calculated, and the tracking result is corrected based on the calculation result.

Figure 6:
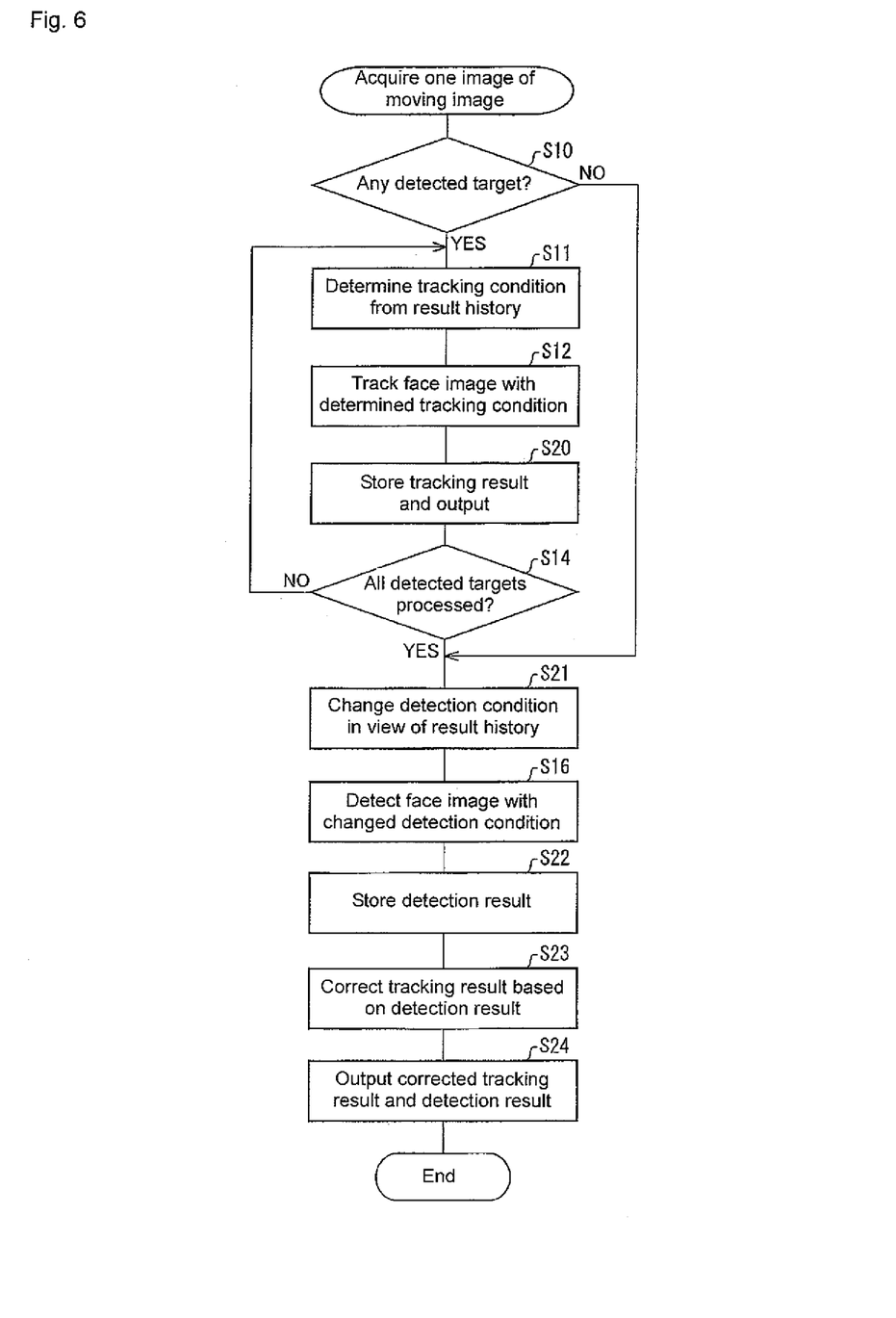
FIG. 6 is a flowchart showing a processing operation of a face detection process and a face tracking process in the digital camera.

FIG. 6 shows a processing operation of the face detection process and the face tracking process in the digital camera 10 having the above configuration. As shown in the figure, when the image acquiring unit 22 acquires one photographed image in a moving image photographed by the photographing unit 11, the condition determining section 30 references the result history in the result history storage section 28 and determines whether or not the detected target exists (S10). If the detected target does not exist, the process proceeds to step S21.

If the detected target exists, the condition determining section 30 determines the tracking condition from the result history (S11), and the face tracking section 25 tracks the detected face image with the determined tracking condition (S12). The face tracking section 25 then stores the tracking result and the tracking condition in the result history storage section 28 (S20).

The condition determining section 30 then determines whether or not all the detected targets are processed (S14). If all the detected targets are not processed, the process returns to step S11 and the above-described processing operations are repeated. If all the detected targets are processed, the process proceeds to step S21.

In step S21, the condition determining section 30 references the detection condition in the result history storage section 28, and changes the detection condition from the detection condition of the previous time. In this case, the condition determining section 30 further changes the detection condition in view of the history of the detection result in the result history storage section 28.

The face detecting section 24 then detects a face image with the changed detection condition (S16). The face detecting section 24 stores the detection result and the detection condition in the result history storage section 28 (S22).

The result correcting section 31 corrects the tracking result of step S12 based on the detection result of step S16 (S23). The positional information output section 26 outputs the positional information of the face image based on the detection result and the positional information of the face image based on the corrected tracking result to the image synthesizing unit 17 (S24). The image synthesizing unit 17 then generates the frame image related to the face image detected by the face detecting section 24, and the frame image related to the face image tracked by the face tracking section 25 and corrected by the result correcting section 31, synthesizes the generated frame images and the photographed image, and displays and outputs the same through the display unit 13. The processing operation is thereafter terminated.

The present invention is not limited to each embodiment described above, and various modifications may be made within the scope defined in the claims, and embodiments obtained by appropriately combining the technical means respectively disclosed in the different embodiments are also encompassed within the technical scope of the present invention.

For instance, each configuration 22 to 28, 30, 31 related to the face detection and the face tracking is arranged in the control unit 20 in the above-described embodiment, but may be arranged in the image processing unit 12. The detection result and the tracking result are displayed and output as the frame image in the above-described embodiment, but control of the photographing unit 11 such as focus adjustment and the like may be performed based on the detection result and the tracking result.

Furthermore, in the above-described embodiment, the face image of a person is detected from the photographed image, and then tracked. However, application is also possible to other moving images such as animation. The image of an upper body and an entire body of a human may be detected, or the image of other moving objects such as a ball, a vehicle, and a transportation load may be detected. Furthermore, application is also possible even in a case of a still object as the still object can move on the photographed image by moving the digital camera 10. That is, the present invention is applicable to the detection of the image of the object that moves on an acquired time-series image.

The present invention is applied to the digital camera 10 in the above-described embodiment, but the present invention can be applied to an arbitrary electronic apparatus including a photographing unit such as a mobile telephone with a camera. Furthermore, application is also possible to an image processing device for acquiring a moving image and performing image processing. Such an image processing device is expected to be applied not only to the digital camera 10 but also to a printer.

Lastly, each block of the digital camera 10, in particular, the control unit 20 and the image processing unit 12 may be configured by hardware logic, or may be realized by software using a CPU as described below.

In other words, the digital camera 10 includes a CPU for executing a command of a control program for realizing each function, a ROM for storing the program, a RAM for developing the program, a storage device (recording medium) such as a memory for storing the program and various data, and the like. The object of the present invention is also achieved by providing the recording medium, which is recorded with a program code (executable form program, intermediate code program, source program) of the control program of the digital camera 10 or software for realizing the above-described functions so as to be readable by a computer, to the digital camera 10, and then having the computer (or CPU or MPU) read out and execute the program code recorded on the recording medium.

The recording medium may be a tape system such as a magnetic tape or a cassette tape, a disc system including a magnetic disc such as a floppy (registered trademark) disc/hard disc and an optical disc such as a CD-ROM/MO/MD/DVD/CD-R, a card system such as an IC card (including a memory card)/optical card, a semiconductor memory system such as a mask ROM/EPROM/EEPROM/flash ROM, or the like.

The digital camera 10 is configured to be connectable with a communication network, and the program code may be provided through the communication network. The communication network is not particularly limited, and the Internet, an intranet, an extranet, a LAN, an ISDN, a VAN, a CATV communication network, a virtual private network, a telephone line network, a mobile communication network, a satellite communication network, and the like may be used. The transmission medium configuring the communication network is not particularly limited, and may be wired lines such as an IEEE 1394, a USB, a power line carrier, a cable TV line, a telephone line, and ADSL line; or wireless lines such as infrared rays such as IrDA and a remote controller, Bluetooth (registered trademark), an 802.11 wireless line, an HDR, a mobile telephone network, a satellite connection, and a digital terrestrial network. The present invention is also realized in a form of a computer data signal embedded in a carrier wave in which a program code is embodied in electronic transmission.

Therefore, when acquiring the photographed image, the digital camera of the present invention detects the face image with respect to the acquired photographed image with the detection condition different from the detection condition of the previous time, and outputs the detection result, although partially, in a short period of time, and thus the present invention can be applied to an arbitrary electronic apparatus for detecting a target image from an original image such as a printer other than the mobile telephone with a camera.

What is claimed is:

1. A target image detection device for detecting all target images from a plurality of sequential photographed images of which a motion picture is composed, the target images being regions of the sequential photographed images that each include all or a predetermined part of an unspecified and undetermined number of subjects, the target image detection device comprising:
   a processor;
   a memory coupled to the processor; and
   a condition storing unit that stores a plurality of detection conditions for detecting the target images;
   the memory comprising:
   an acquiring unit, executed by the processor, that sequentially acquires the plurality of sequential photographed images on a real-time basis from a photographing unit;
   a choosing unit, executed by the processor, that chooses a detection condition different from a detection condition of a previous time of a plurality of detection conditions for detecting the target images, the plurality of detection conditions being stored in the condition storing unit;
   a detecting unit, executed by the processor, that, with the detection condition chosen by the choosing unit, performs a search of an image to detect at least one of the target images from a single photographed image acquired on the real-time basis through the photographing unit by the acquiring unit; and
   an output unit, executed by the processor, that synthesizes a photographed image sequentially acquired on the real-time basis from the photographing unit and a figure indicating that the target image detected by the detecting unit is contained inside the figure and that sequentially outputs a synthesized image on the real-time basis to an outside of the target image detection device,
   wherein in a first case where the acquiring unit has acquired a first photographed image from the photographing unit, the detecting unit detects a first target image from the acquired first photographed image with a first detection condition, and the output unit synthesizes a first figure for the detected first target image and either the first photographed image or an a-th photographed image, which is a photographed image acquired subsequently from the photographing unit, and outputs a synthesized image,
   wherein in a second case where the acquiring unit has acquired a second photographed image from the photographing unit after acquiring the first photographed image, the detecting unit detects a second target image with a second detection condition different from the first detection condition, and the output unit synthesizes the first figure and a second figure for the detected first and second target images and a b-th photographed image that the output unit has acquired from the photographing unit after acquiring the a-th photographed image and outputs a synthesized image, wherein in a third case where the acquiring unit has acquired a third photographed image from the photographing unit after acquiring the second photographed image, the detecting unit detects a third target image with a third detection condition different from the first and second detection conditions, and the output unit synthesizes the first and second figures and a third figure for the detected first to third target images and a c-th photographed image that the output unit has acquired from the photographing unit after acquiring the b-th photographed image and outputs a synthesized image, and wherein the acquiring unit, the detecting unit, and the output unit repeat the first case, the second case, and the third case at a time interval of one to a few frames of the sequentially photographed images until the detecting unit uses all of the plurality of detection conditions necessary to detect all of the target images in the photographed image.

2. The target image detection device according to claim 1, wherein the memory further comprises:
a result history storage unit for storing a history of the detection result detected by the detecting unit, and
wherein the choosing unit further chooses the detection condition based on the history of the detection result in the result history storage unit.

3. The target image detection device according to claim 1, wherein
the choosing unit sequentially chooses the detection condition from the plurality of detection conditions for detecting the target image.

4. The target image detection device according to claim 1, wherein
the acquiring unit acquires, as the plurality of sequential photographed images, a plurality of still images of which a motion picture is composed;
the processor further comprises a tracking unit for tracking, with respect to a photographed image of a certain time point acquired by the acquiring unit, the target image detected by the detecting unit in the photographed image of a time point after the time point; and
the output unit further outputs a tracking result tracked by the tracking unit.

5. The target image detection device according to claim 4, wherein the processor further comprises a correcting unit for correcting the tracking result tracked by the tracking unit based on the detection result detected by the detecting unit, and
wherein the output unit outputs the tracking result corrected by the correcting unit instead of the tracking result tracked by the tracking unit.

6. The target image detection device according to claim 1, wherein the target image detection device is disposed in an electronic apparatus.

7. The target image detection device according to claim 6, wherein the electronic apparatus includes:
a display unit for displaying the image outputted by the output unit.

8. The target image detection device according to claim 1, further comprising a computer capable of executing control software that causes the computer to function as each unit, and wherein the control software for operating the target image detection device is stored on a non-transitory computer readable medium.

9. A method for controlling a target image detection device for detecting all target images from a plurality of sequential photographed images of which a motion picture is composed, each of the target image being regions of the sequential photographed images that each include all or a predetermined part of an unspecified and undetermined number of subjects, the method comprising:
acquiring sequentially the plurality of sequential photographed images on a real-time basis;
choosing a detection condition different from a detection condition of a previous time of a plurality of detection conditions for detecting the target images;
searching, with the detection condition chosen in the choosing step, an image to detect at least one of the target images from a single photographed image acquired, on the real-time basis, in the acquiring step; and
synthesizing a photographed image sequentially acquired on the real-time basis in the acquiring step and a figure indicating that the target image detected in the detecting step is contained inside the figure and outputting sequentially a synthesized image on the real-time basis to an outside of the target image detection device
wherein in first a case where a first photographed image has been acquired in the acquiring step, a first target image is detected in the detecting step from the acquired first photographed image with a first detection condition, a first figure for the detected first target image is synthesized in the outputting step with either the first photographed image or an a-th photographed image, which is a photographed image acquired subsequently, and a synthesized image is outputted,
wherein in a second case where the acquiring step has acquired a second photographed image after acquiring the first photographed image, a second target image is detected in the detecting step with a second detection condition different from the first detection condition, and synthesizing the first figure and a second figure for the detected first and second target images and a b-th photographed image after acquiring the a-th photographed image and outputting a synthesized image,
wherein in a third case where the acquiring step has acquired a third photographed image after acquiring the second photographed image, a third target image is detected with a third detection condition different from the first and second detection conditions, and synthesizing the first and second figures and a third figure for the detected first to third target images and a c-th photographed image after acquiring the b-th photographed image and outputting a synthesized image, and
wherein the first case, the second case, and the third case are repeated at a time interval of one to a few frames of the sequentially photographed images until the detecting step uses all of the plurality of detection conditions necessary to detect all of the target images in the photographed image.

10. A non-transitory computer readable medium storing a program for causing a computer to perform a method for controlling a target image detection device for detecting all target images from a plurality of sequential photographed images of which a motion picture is composed, each of the target image being regions of the sequential photographed images that each include all or an unspecified and undetermined number of subjects, the method comprising:
acquiring sequentially the plurality of sequential photographed images on a real-time basis;
choosing a detection condition different from a detection condition of a previous time of a plurality of detection conditions for detecting the target images;

searching, with the detection condition chosen in the choosing step, an image to detect at least one of the target images from a single photographed image acquired, on the real-time basis, in the acquiring step; and synthesizing a photographed image sequentially acquired on the real-time basis in the acquiring step and a figure indicating that the target image detected in the detecting step is contained inside the figure and outputting sequentially a synthesized image on the real-time basis to an outside of the target image detection device wherein in first a case where a first photographed image has been acquired in the acquiring step, a first target image is detected in the detecting step from the acquired first photographed image with a first detection condition, a first figure for the detected first target image is synthesized in the outputting step with either the first photographed image or an a-th photographed image, which is a photographed image acquired subsequently, and a synthesized image is outputted, wherein in a second case where the acquiring step has acquired a second photographed image after acquiring the first photographed image, a second target image is detected in the detecting step with a second detection condition different from the first detection condition, and synthesizing the first figure and a second figure for the detected first and second target images and a b-th photographed image after acquiring the a-th photographed image and outputting a synthesized image, wherein in a third case where the acquiring step has acquired a third photographed image after acquiring the second photographed image, a third target image is detected with a third detection condition different from the first and second detection conditions, and synthesizing the first and second figures and a third figure for the detected first to third target images and a c-th photographed image after acquiring the b-th photographed image and outputting a synthesized image, and wherein the first case, the second case, and the third case are repeated at a time interval of one to a few frames of the sequentially photographed images until the detecting step uses all of the plurality of detection conditions necessary to detect all of the target images in the photographed image.

11. The target image detection device according to claim 2, wherein based on the history of the detection result as stored in the result history storage unit, the detecting section increases a frequency at which the detection condition having a high possibility of detecting a target image is chosen by the choosing unit as the detection condition, and reduces a frequency at which the detection condition having a low possibility of detecting a target image is chosen by the choosing unit as the detection condition.

12. The target image detection device according to claim 4, wherein the tracking unit tracks a target image based on a tracking condition acquired from the detection condition.

13. The target image detection device according to claim 5, wherein the correction unit corrects the tracking result tracked by the tracking unit, based on the detection result detected by the detecting unit and a history of the detection result detected by the detecting unit.

14. The target image detection device according to claim 1, wherein the output unit outputs information on a position of the target image in a photographed image.

* * * * *